(12) United States Patent
Angel et al.

(10) Patent No.: US 8,985,611 B1
(45) Date of Patent: Mar. 24, 2015

(54) INVERTED BENT BAR TRAILER HITCH

(71) Applicants: Bruce A. Angel, Stokesdale, NC (US);
Steven L. Spencer, Lawsonville, NC (US)

(72) Inventors: Bruce A. Angel, Stokesdale, NC (US);
Steven L. Spencer, Lawsonville, NC (US)

(73) Assignee: Camco Manufacuring, Inc., Greensboro, NC (US)

( * ) Notice: Subject to any disclaimer, the term of this patent is extended or adjusted under 35 U.S.C. 154(b) by 0 days.

(21) Appl. No.: 14/074,843

(22) Filed: Nov. 8, 2013

(51) Int. Cl.
*B60D 1/24* (2006.01)
(52) U.S. Cl.
CPC ...................................... *B60D 1/247* (2013.01)
USPC ....................................................... 280/405.1
(58) Field of Classification Search
CPC ........... B60D 1/247; B60D 1/34; B60D 1/347
USPC ............ 280/124.152, 405.1, 455.1, 459, 483, 280/689
See application file for complete search history.

(56) References Cited

U.S. PATENT DOCUMENTS

| | | | |
|---|---|---|---|
| 5,375,867 A | 12/1994 | Kass et al. | 280/457 |
| 5,465,991 A | 11/1995 | Kass et al. | 280/457 |
| 6,860,501 B2 | 3/2005 | Schmidt et al. | 280/455.1 |
| 8,025,307 B2 * | 9/2011 | Moore et al. | 280/455.1 |

OTHER PUBLICATIONS

Co-pending U.S. Appl. No. 13/714,798, filed Dec. 14, 2012 of Bruce A. Angel entitled "Anti-sway Trailer Hitch and Method", (Specification, Abstract and Drawing Figs. 1-6—26 pgs.).
One (1) page printout from "Andersenhitches.com" showing 4Δ and 8Δ drop/rise weight distribution hitch kits; Copyright 2011.

\* cited by examiner

*Primary Examiner* — Joseph Rocca
*Assistant Examiner* — Felicia L Brittman
(74) *Attorney, Agent, or Firm* — Blake P. Hurt

(57) ABSTRACT

An inverted bent bar weight distributing trailer hitch including a mono trunnion with a shank rotatably mounted therein. The mono trunnion is positioned on a base that contains a resistance member that engages the bottom portion of the trunnion. A biasing member is adjustably attached to the exterior of the base. By engaging the biasing member, the resistance member restricts the rotation of the mono trunnion about the shank.

19 Claims, 7 Drawing Sheets

INVERTED BENT BAR TRAILER HITCH

FIELD OF THE INVENTION

The invention herein pertains to trailer hitches and particularly pertains to an inverted, bent bar, weight distributing trailer hitch for use in controlling large loads.

DESCRIPTION OF THE PRIOR ART AND OBJECTIVES OF THE INVENTION

Co-applicant of the instant application Bruce A. Angel filed an earlier application (U.S. patent application Ser. No. 13/714,798) entitled "Anti-sway Trailer Hitch and Method" which disclosed a hitch with an opposing pair of engagement members to control trailer sway. This earlier filed application is incorporated by reference in its entirety herein.

The present application pertains to bent bar trailer hitches which are also known in the art as devices that may be used to distribute the weight or control the sway of towed loads. See for example, U.S. Pat. No. 6,860,501 to Schmidt et al., U.S. Pat. No. 5,465,991 to Kass et al., and U.S. Pat. No. 5,375,867 to Kass et al. In each case, these hitches include L-shaped bars extending below and behind a ball head hitch mount which engages a towed vehicle, for example a trailer, at a location further aft. This design is effective in distributing the weight of a towed load more evenly between the axles of a tow vehicle in relation to, for example, a trailer. However, significant hardware and manual effort need to be expended in attaching and securing the bars both to the hitch and the trailer. As the average age of the American public increases, superfluous bending, twisting, and stretching of the arms, legs, and back is likely to increase the amount of discomfort generally and number of injuries specifically associated with the use of these trailer designs. Therefore, there exists a need in the trailer market for an efficient bent bar, weight distributing trailer hitch design that reduces much of the strain imparted on the user during assembly and use.

Thus, in view of the problems and disadvantages associated with prior art devices, the present invention was conceived and one of its objectives is to provide a bent bar weight distributing trailer hitch with an inverted trunnion.

It is another objective of the present invention to provide a weight distributing hitch that receives bent bars from above the trunnion.

It is still another objective of the present invention to provide an adjustable resistance bent bar hitch that resists trunnion rotation in a graduated manner.

It is yet another objective of the present invention to provide a bent bar hitch that is easy to manufacture and operate.

It is a further objective of the present invention to provide a bent bar hitch with a resistance member in the base adjustably biased by a plurality of biasing members to resist trunnion rotation.

It is still a further objective of the present invention to provide a weight distributing hitch with a pair of hanger plates each defining a channel for receiving a finger attached to different ones of a pair of bent bars.

It is yet a further objective of the present invention to provide a weight distributing hitch with a biasing member that cooperates with a rod defining a cammed surface in engaging a resistance member.

Various other objectives and advantages of the present invention will become apparent to those skilled in the art as a more detailed description is set forth below.

SUMMARY OF THE INVENTION

The aforesaid and other objectives are realized by providing a bent bar trailer hitch including a mono trunnion disposed between a top and a base and a shank running through the center. While the top and base are fixedly attached to the hitch, the mono trunnion pivots about the shank and defines a pair of apertures on the top surface for receiving different ones of a pair of L-shaped bent bars. The base includes a ball bearing adjustably engaging the bottom of the trunnion and the trunnion defines a groove corresponding to the shape of the bearing. The base also has a pair of ears defining a pair of aligned bores and one or more spring steel plates attached to the bottom of the base. The bores are sized to receive a cammed rod that, when rotated, manually engages the bearing and increases the frictional resistance imparted on the trunnion.

The pair of bent bars are attached in opposing relation on different sides of a towed load, for example a trailer, camper, or the like. Each bar includes a finger extending downward from the bar which is sized for reception in a channel defined by arms connected to a hanger plate. The finger includes a base which has a diameter greater than the width of the channel, preventing the pin from vertically displacing during towing activities. The hanger plate is attached to a mount plate and both plates define a plurality of apertures that allow the plates to be affixed to a wide range of trailers. The arms of the hanger plate each define a port at one end, the ports are sized to receive a pin horizontally therethrough, preventing the finger from displacing laterally during towing activities.

DETAILED DESCRIPTION OF THE PREFERRED EMBODIMENT AND OPERATION OF THE INVENTION

For a better understanding of the invention and its operation, turning now to the drawings, FIGS. 1-5 display inverted, bent bar weight distributing trailer hitch 10. In this context, "inverted" refers to a bent bar trailer hitch that receives one or more bars vertically above the trunnion, compared to attaching the bars below the trunnion as is conventional.

Figure 1:
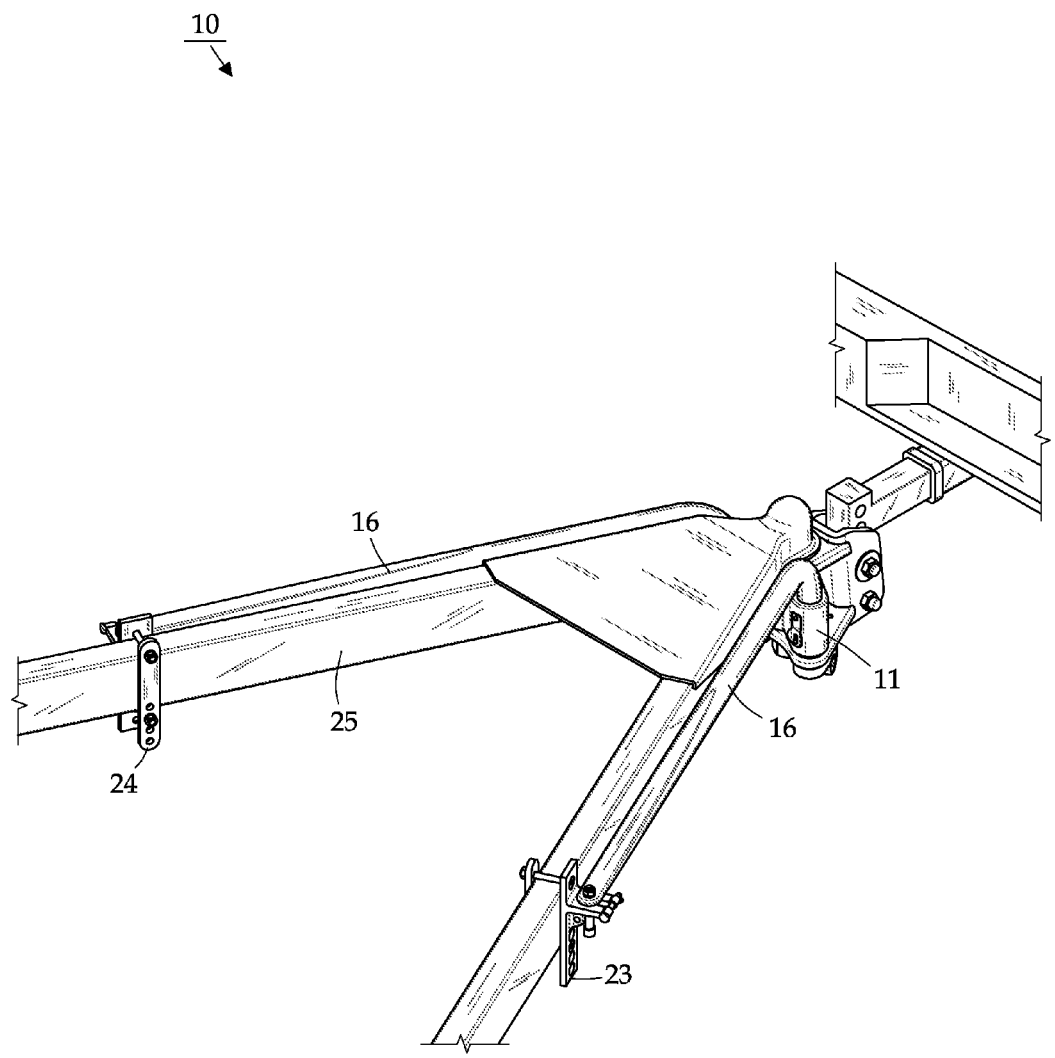
FIG. 1 shows a side elevated perspective view of a trailer hitch engaged with a trailer and a tow vehicle.
Figure 5:
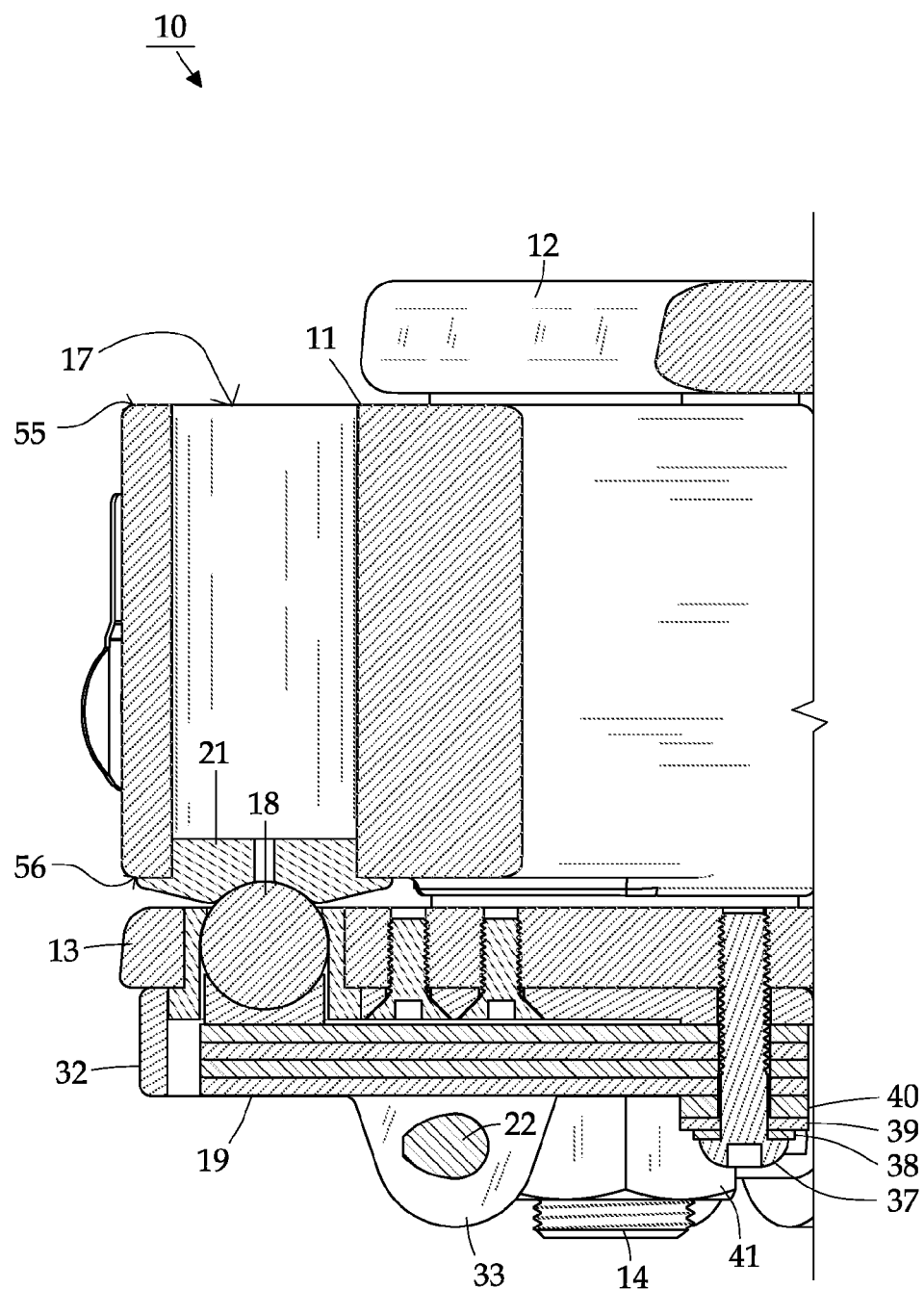
FIG. 5 shows a cross-sectional view of one side of the trunnion of the trailer hitch as shown assembled in FIG. 3 along lines 5-5, the opposite side of the trunnion being a mirror image thereof.

FIG. 1 shows a side elevated perspective view of trailer hitch 10 comprised of mono trunnion 11 rotatably attached between hitch top 12 and base 13, a cross-section of a portion thereof is shown in FIG. 5. Shank 14 (FIG. 2) passes through top 12, shank collar 44 and is received within sleeve 43 positioned in central opening 50 of mono trunnion 11 and continues through shank collar 44' and base 13 and may be threadably affixed below base 13 via nut 41 and washer 42 as is known in the art. Ball 15 is preferably connected to the top of shank 14 to provide mechanical attachment to a towed load, for example trailer 25, in a conventional manner as is known in the art. Shank 14 and ball 15 may also be integrally formed in unitary conformation. L-shaped bent bars 16 may be inserted into mono trunnion 11 from above as illustrated and described in greater detail below, relieving a user from having to bend and stretch significantly to secure bars 16 to mono trunnion 11.

The term "mono trunnion" in this manner refers to integrated trunnion 11 that pivots about a single rotational point but defines one or more apertures for receiving bars 16. Preferred C-shaped mono trunnion 11 defines a pair of vertically oriented, cylindrically shaped apertures 17 formed in trunnion top surface 55, each sized to receive one of bent bars 16. Mono trunnion 11 may be formed from any suitable material capable of withstanding great torsional strain imparted from rotating heavy towed loads and tow vehicles but is preferably formed from steel.

Figure 2:
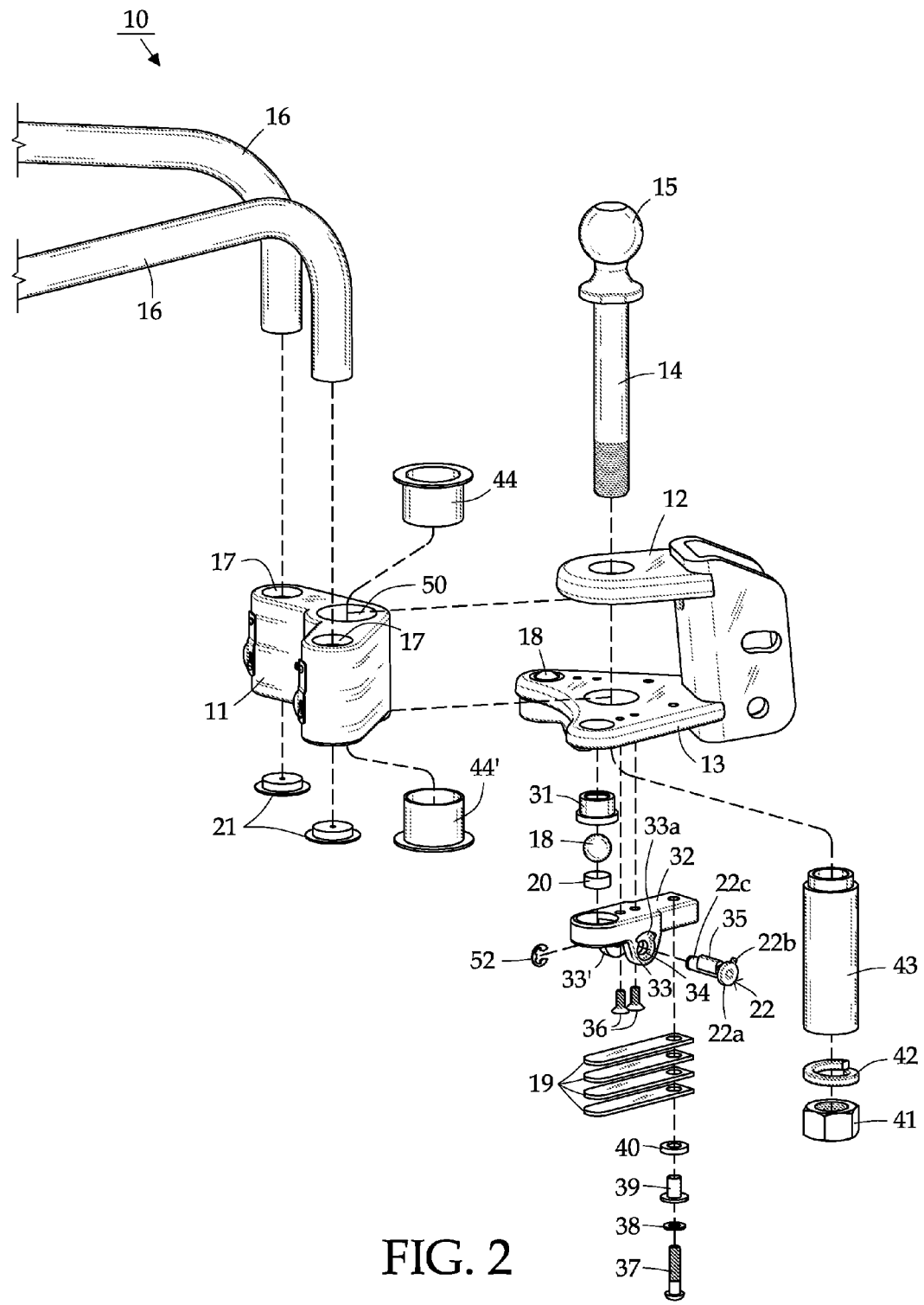
FIG. 2 pictures an exploded side perspective view of the components of the trailer hitch in FIG. 1.

FIG. 2 pictures an exploded side perspective view of the various components of trailer hitch 10, including mono trunnion 11, top 12, base 13, shank 14, resistance member 18, resistance mount 32 and biasing member 19. Top 12 defines a U-shape having a shank opening sized for slideably receiving shank 14 whereas base 13 includes an opposing complimentary shank opening, a pair of smaller opposing side openings and a series of even smaller threaded fastener openings. Top 12 may also define an underside with a counter-bore sized to engage a shoulder formed in sleeve 43, which is positioned between top 12 and base 13 and is preferably welded into position. Sleeve 43 may receive shank 14, and mono trunnion 11 may pivot about the longitudinal axis of shank 14 or sleeve 43, with either serving as axle member 49, in addition to mono trunnion 11 pivoting about the combination as is preferred.

Preferably, resistance member 18 is a ball bearing but other resistance-inducing structures such as projections, bumps, catches, and the like may also suffice. In one or more embodiments of trailer hitch 10, resistance member 18 is positioned between base 13 and mono trunnion 11 within ball guide 31 and housing 20. Both ball guide 31 and housing 20 may each define a receptacle surface corresponding to the exterior surface of resistance member 18 (such as seen in the cross section of FIG. 5). In preferred trailer hitch 10, the receptacle surface defines an arcuate surface to correspond to the exterior surface of a ball bearing which resists trunnion 11 from smoothly and efficiently pivoting around shank 14 as described further below. Trailer hitch 10 may also include engagement sockets 21 attached to trunnion bottom surface 56 to engage resistance member 18 and increase friction on mono trunnion 11 during rotation. Engagement sockets 21 are preferably formed from planar steel and seat within the bottoms of apertures 17 in mono trunnion 11. Sockets 21 include a central opening therethrough to allow drainage should rain, melted snow, or the like gain access within apertures 17 and foul the proper seating of bent bars 16.

During assembly of resistance mount 32 with base 13, ball guide 31 is positioned within a cylindrical opening of base 13 from beneath whereby the lower flange of ball guide 31 abuts the bottom of base 13. Thereafter resistance member 18 is inserted within ball guide 31 followed by housing 20. Resistance mount 32 can then be positioned against base 13. Resistance mount 32 preferably defines a pair of downwardly depending opposing ears 33, 33' integrally formed therewith that each define depressions or indents 33a, 33a' and bores 34, 34' (33a' and 34' not shown but positioned on opposing side of mount 32) sized for reception of rod 22 therein. Resistance mount 32 further defines a series of threaded fastener receiving openings and a larger cylindrical opening sized to receive the lower flange of ball guide 31 therein. The threaded fastener receiving openings are complementary to the threaded fastener receiving openings formed in base 13 for connection thereto. Once resistance mount 32 is seated against base 13 it can be affixed thereto such as by fasteners 36 which may be for example screws, bolts, or the like or other appropriate fastening techniques such as adhesives can be utilized. Thereafter biasing member 19 is securely affixed to mount 32 and base 13, for example with spring fastener 37, washer 38, sleeve 39, and compression washer 40 that are preferably positioned underneath and diagonally distal to resistance member 18 to provide the most direct transfer of force from biasing member 19. Thereafter, rod 22 passes through bores 34, 34' in ears 33, 33' where it is secured therein by C-clip 52. Rod 22 includes knob 22a having protuberance 22b extending outwardly therefrom and shaft 22c defining cammed surface 35 extending along at least one side thereof. Rod 22 is represented in this embodiment of hitch 10 as cylindrical in shape but other geometries defining protruding surfaces, be they separate or integrally formed, are also contemplated herein.

Preferred biasing member 19 is comprised of a plurality of metallic spring plates each having a distal opening for receiving fastener 37 therethrough. Other biasing members such as coil springs or the like that may be adjustably compressed may also be used in conjunction with an embodiment of hitch 10. Biasing member 19 may be manually engaged by rod 22 and compressed, which may increase the force exerted on resistance member 18 in the direction of mono trunnion 11. In preferred hitch 10, this compression takes place due to rod 22 defining cammed surface 35, resulting in an increase or decrease in the force imparted on resistance member 18 as rod 22 is rotatably urged, for example in a clockwise manner. Preferred resistance mount 32 defines a U-shape with squared end and biasing member 19 is also formed having a corresponding U-shape with squared end for fitting within resistance mount 32 without excess material or overhang to inadvertently engage nearby structures.

Indents 33a, 33a' may be formed defining a dual-chambered opening with the top or upper arcuate portion being significantly smaller but with a greater diameter than the lower cylindrical portion whereby knob 22a is received within the lower cylindrical portion and protuberance 22b is received within the top arcuate portion for adjustable movement therein. As would be understood, knob 22a with protuberance 22b is received within indent 33a such that protuberance 22b fits within and is rotatable from one side of the top arcuate portion of indent 33a to the other side. Such rotation causes cammed surface 35 to either engage or disengage biasing members 19 to apply tension to resistance member 18 as described. Should disengagement be desired knob 22 may be rotated counterclockwise to the left whereby cammed surface 35 is horizontal (parallel) with biasing members 19 as seen in the cross section in FIG. 5. In this position protuberance 22b would be to the far left of the upper arcuate portion of indent 33a and biasing member 19 would be in its normal posture lessening the tension applied to resistance member 18 and thus allowing movement of trunnion 11 thereover.

For engagement, knob 22 may be rotated clockwise to the right whereby protuberance 22b would be to the right of the upper arcuate portion of indent 33a and cammed surface 35 would be vertical (perpendicular) to biasing members 19 and applying pressure thereto. This pressure would cause the proximal end of biasing member 19 to be urged upwardly applying pressure to resistance member 18 thus exerting frictional engagement on engagement socket 21 to limit the rotational movement of mono trunnion 11.

Knob 22a further includes a center inset sized to receive a hexagonal or conventional allen wrench for rotating knob 22 as needed to engage or disengage cammed surface 35 with biasing member 19 for the desired resistance. Although not discussed as would be understood trailer hitch 10 includes resistance mount 32 on each side of base 13 with the opposing resistance mount 32 being a mirror image of the exploded resistance mount 32 depicted in FIG. 2 and as such each rod 22 would need correlating adjustment for proper operation of trailer hitch 10.

Figure 3:
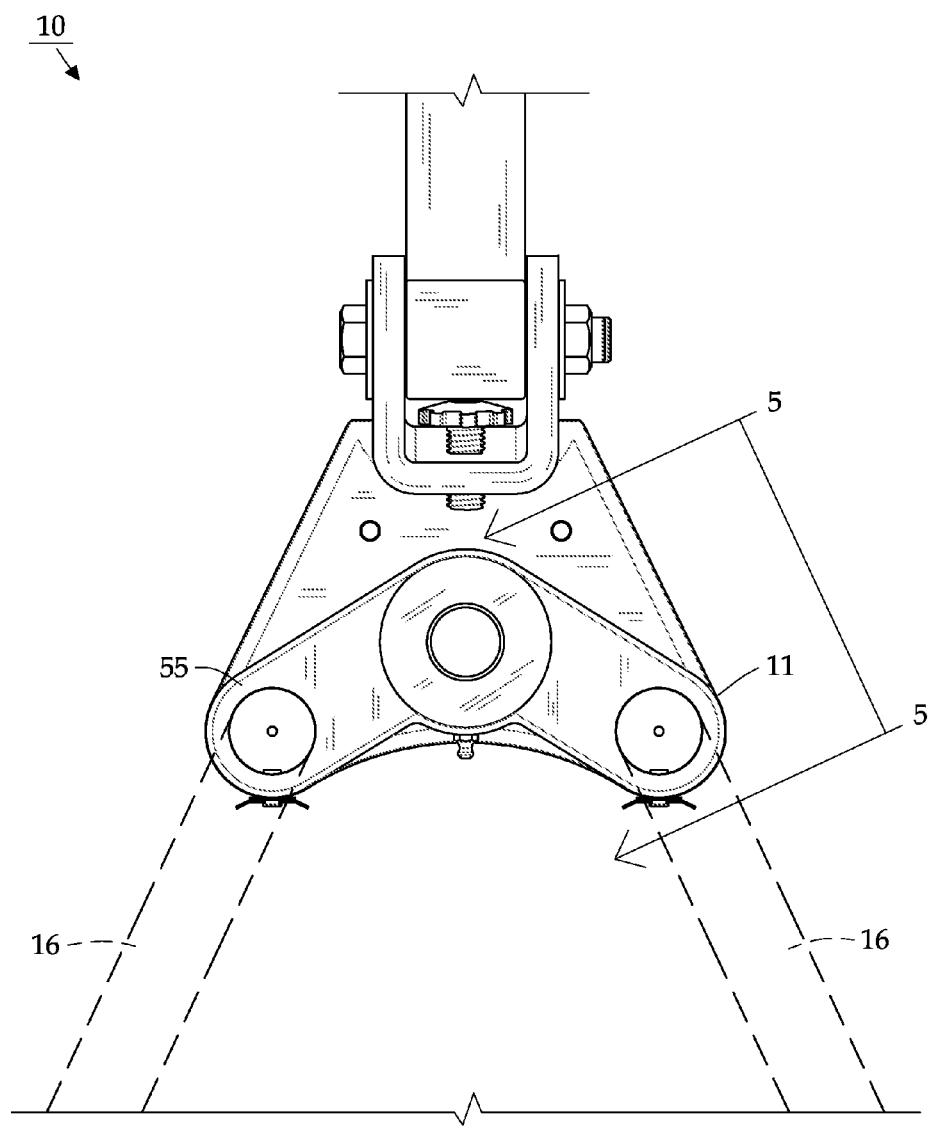
FIG. 3 depicts a partial, top plan view of the trailer hitch of FIG. 1 in a first position.
Figure 3A:
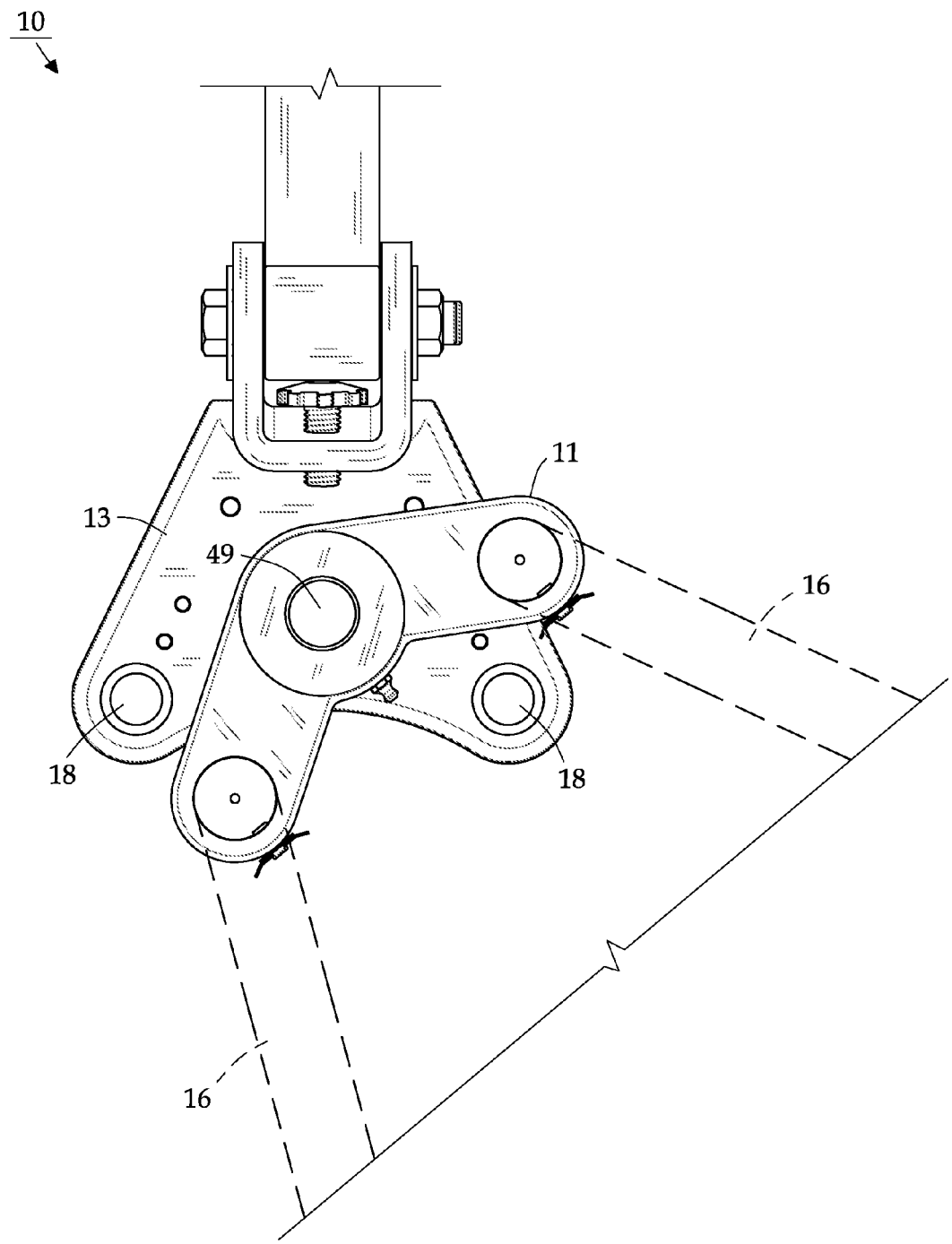
FIG. 3A demonstrates a top plan view of the trailer hitch of FIG. 3 in a second position.

FIG. 3 depicts a top plan view of mono trunnion top surface 55 with trailer hitch 10 in a first position with hitch top 12 and trailer 25 removed. FIG. 3A demonstrates a top plan view of trailer hitch 10 in a second, pivoted position with the same components removed as FIG. 3. Bars 16 extend from mono trunnion 11 away from the tow vehicle and towards trailer 25. While L-shaped bent bars 16 are known in the art, any shaped bar that rises vertically above mono trunnion 11 and engages trailer 25 may be utilized with trailer hitch 10. Although the L-shaped ends of bars 16 define a circular cross-section, it should be understood that bars 16 and corresponding apertures 17 may define any desired shape, and that neither the shape of bars 16 and apertures 17 nor the resulting geometrical engagements should be considered a limiting factor of trailer hitch 10.

In use, rod 22 may be manually rotated causing cammed surface 35 to disengage biasing member 19, reducing the upward force imparted on resistance member 18 and by extension mono trunnion 11. This reduction in force permits greater rotation of mono trunnion 11, for example in an operating environment where easier pivoting is valued, for example during low speed navigation of a parking lot or camp site. Similarly, when cammed surface 35 engages biasing member 19, greater upward force is imparted on resistance member 18 in the direction of mono trunnion 11, making rotation of mono trunnion 11 more difficult, for example during high speed towing operation, where uninhibited rotation of mono trunnion 11 may lead to an unbalanced force relationship between the tow vehicle and the towed load.

Figure 4:
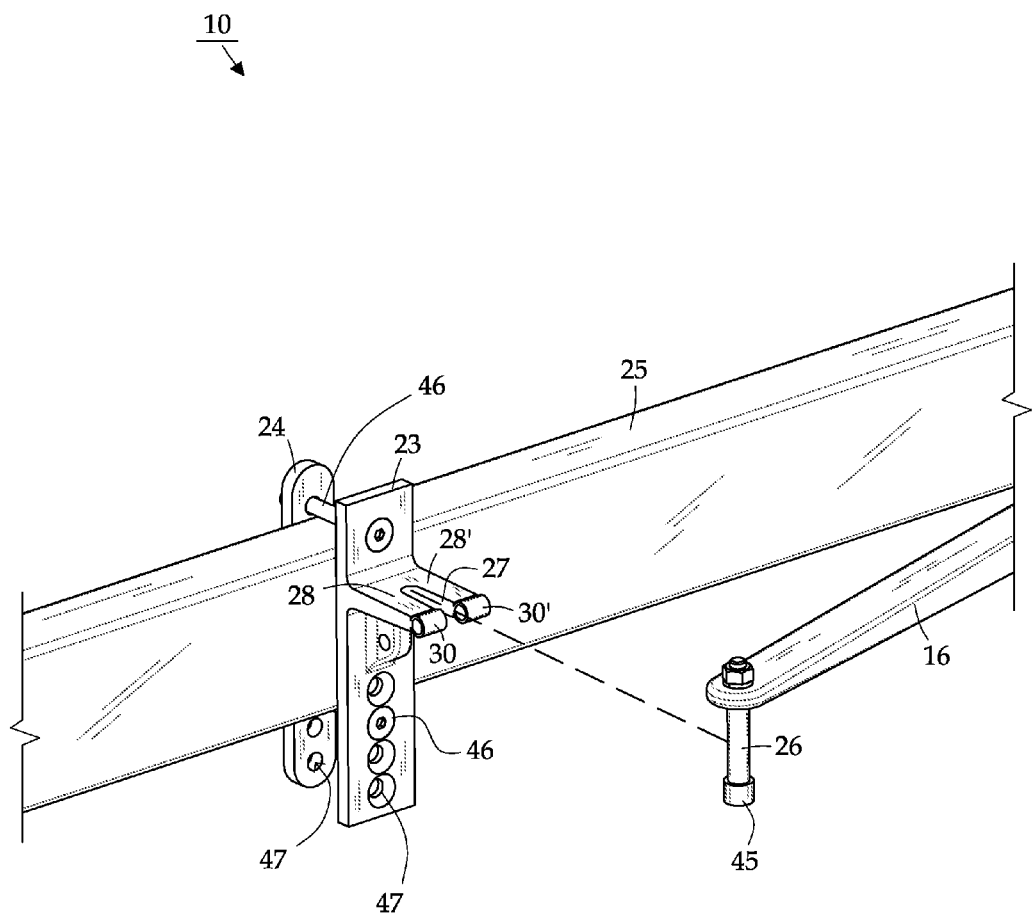
FIG. 4 illustrates an enlarged side perspective view of a trailer hitch bar and hanger plate in a first position.
Figure 4A:
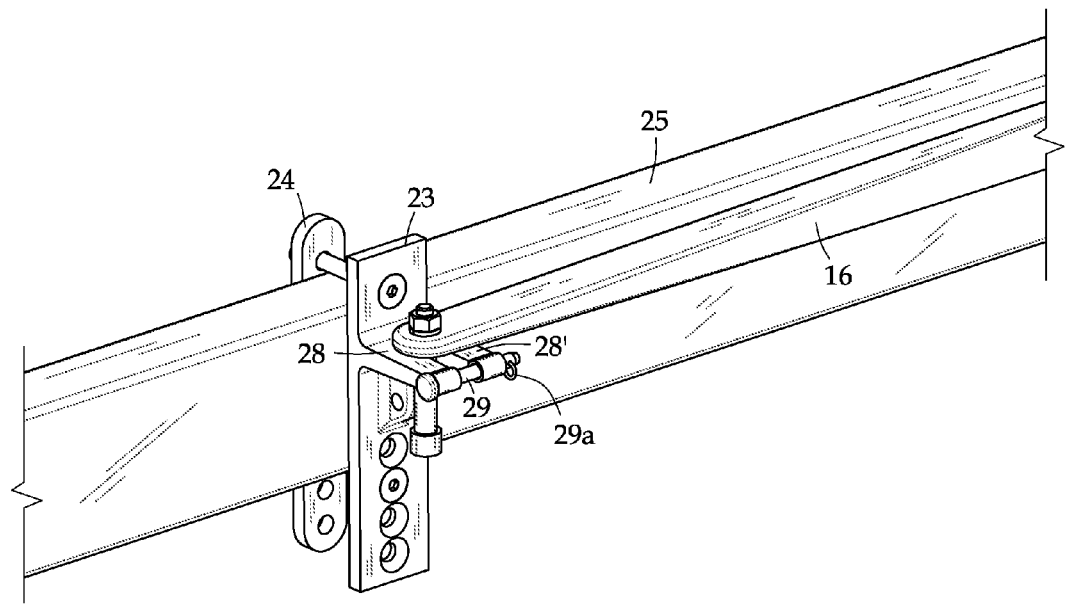
FIG. 4A features an enlarged side perspective view of a trailer hitch bar and hanger plate in a second position.

FIG. 4 illustrates an enlarged side perspective view of hanger plate 23 and mount plate 24 with hitch bar 16 in a first position, compared to FIG. 4A which features a view of bar 16 and hanger plate 23 in a second, engaged position. The end of bar 16 proximate the tow vehicle is positioned within bar aperture 17 and remains firmly in place due to gravity and the great weight of a towed load, trailer, and the like. The end of bar 16 proximate trailer 25 preferably includes downwardly pending cylindrical finger 26. Finger 26 is sized to be received into channel 27 formed from opposing arms 28, 28' which are perpendicularly affixed to hanger plate 23. Arms 28, 28' may also define respective ports 30, 30' at the ends opposite hanger plate 23. As shown in FIG. 4A, finger 26 may be positioned laterally to channel 27 during the primary assembly of trailer hitch 10. As bar 16 pivots into position, finger 26 passes between arms 28, 28' into channel 27 and may be secured therein by pin 29 inserted into pin ports 30 as shown in FIG. 4A. A conventional pin clip 29a is utilized to prevent pin 29 from displacement. Preferred finger 26 is threadably affixed to bar 16 such as with a washer and nut as illustrated and includes finger base 45 that defines a diameter greater than the width of channel 27. In this manner, finger 26 cannot dissociate from hanger plate 23 should bar 16 be urged vertically upward, for example if the tow vehicle were to engage a speed bump or the like.

As shown in FIGS. 4 and 4A, hanger plate 23 and mount plate 24 each define a plurality of apertures 47 which are countersunk into the respective plate surfaces. Apertures 47 are sized to receive plate bolt 46 and are vertically spaced to permit hanger plate 23 and mount plate 24 to engage a variety of trailer sizes and styles.

The illustrations and examples provided herein are for explanatory purposes and are not intended to limit the scope of the appended claims. It is understood that structures such as mono trunnion 11, bars 16, and their respective components are symmetrically duplicated as shown in FIGS. 1-4A. All descriptions of one structure equally apply to the corresponding structure on the opposite side of trailer hitch 10 unless otherwise indicated.

We claim:

1. A trailer hitch comprising: a trunnion defining an aperture, an axle member, said axle member mounted within said trunnion, a base, said trunnion contacting said base, a bar, said aperture sized to vertically receive said bar therein, a resistance member, a biasing member, said biasing member adjustably attached to said base, said resistance member positioned within said base and engaging said trunnion, wherein said resistance member restricts the rotation of said trunnion about said axle member.

2. The hitch of claim 1 wherein said resistance member is a bearing.

3. The hitch of claim 1 wherein said trunnion defines a top surface and a bottom surface, said aperture positioned on said top surface.

4. The hitch of claim 1 further comprising a pair of ears, each of said ears defining a bore, said pair of ears affixed to said base and extending beneath said biasing member, a rod, said rod contacting said biasing member, each of said bores sized to receive said rod therein.

5. The hitch of claim 4 wherein said rod defines a cammed surface.

6. The hitch of claim 1 further comprising a hanger plate, a mount plate, said hanger plate engaging said mount plate, a pair of arms, said arms affixed to said hanger plate, said arms defining a channel.

7. The hitch of claim 6 further comprising a finger, said finger attached to said bar, said channel sized to receive said finger.

8. The hitch of claim 6 wherein said hanger plate and said mount plate each define a series of apertures, said apertures for adjustably affixing said hanger plate to said mount plate.

9. The hitch of claim 8 wherein said pair of arms each define a port, a pin, said pin sized to be received within said ports.

10. A hitch comprising: a trunnion, an axle member, a top, a base, said trunnion positioned between said top and said base, said axle member mounted within said trunnion, said top, and said base, a ball, said ball connected to said axle member above said top, a resistance member, a biasing member, said biasing member adjustably attached to said base, said resistance member positioned within said base and engaging said trunnion, said trunnion defining a pair of opposing apertures on a top surface, a pair of bars, said apertures positioned to vertically receive different ones of said bars therein, wherein said resistance member restricts the rotation of said trunnion about said axle member when said bars are laterally displaced.

11. The hitch of claim 10 wherein said resistance member is a bearing.

12. The hitch of claim 10 wherein said biasing member comprises a plurality of metal plates.

13. The hitch of claim 10 further comprising a pair of ears, each of said ears defining a bore, said pair of ears affixed to said base and extending beneath said biasing member, a rod, said rod contacting said biasing member, each of said bores sized to receive said rod therein.

14. The hitch of claim 13 wherein said rod defines a cammed surface.

15. The hitch of claim 10 further comprising a hanger plate, a mount plate, said hanger plate engaging said mount plate, a pair of arms, said arms affixed to said hanger plate, said arms defining a channel.

16. The hitch of claim 15 further comprising a finger, said finger attached to one of said bars, said channel sized to receive said finger.

17. The hitch of claim 16 wherein said finger forms a base, said base defining a diameter greater than the finger, such that the base cannot pass between the arms.

18. The hitch of claim 15 wherein said hanger plate and said mount plate each define a series of apertures, said apertures for adjustably affixing said hanger plate to said mount plate.

19. The hitch of claim 15 wherein said pair of arms each define a port, a pin, said pin sized to be received within said ports.

* * * * *